United States Patent
Addo et al.

(10) Patent No.: US 6,173,739 B1
(45) Date of Patent: Jan. 16, 2001

(54) ADDOW'S CHECKVALVED FDC

(76) Inventors: Abdul Addo, 10070 Gilbert St. Apt. #18, Anaheim, CA (US) 92804; Ali Addo, 235 W. Grove St. Apt. #B3, Pomona, CA (US) 91767

(*) Notice: Under 35 U.S.C. 154(b), the term of this patent shall be extended for 0 days.

(21) Appl. No.: 09/222,724

(22) Filed: Dec. 29, 1998

(51) Int. Cl.[7] .................................................. F16K 15/03
(52) U.S. Cl. ...................... 137/512.1; 137/550; 137/583; 137/360; 169/16
(58) Field of Search ................................. 137/512.1, 550, 137/583, 360; 169/13, 16

(56) References Cited

U.S. PATENT DOCUMENTS

| | | | |
|---|---|---|---|
| 752,327 | * | 2/1904 | Brown .................................. 169/16 X |
| 793,931 | * | 7/1905 | Hodge et al. .......................... 169/16 |
| 1,939,764 | * | 12/1933 | Chandler ................................ 169/13 |
| 3,892,257 | * | 7/1975 | Zia ................................... 137/550 X |
| 4,043,358 | * | 8/1977 | Sliski ................................. 137/512.1 |
| 4,342,251 | * | 8/1982 | Wahlfeldt et al. ....................... 86/1.1 |
| 4,602,654 | * | 7/1986 | Stehling et al. .............. 137/512.1 X |
| 4,850,796 | * | 7/1989 | Miller ............................. 137/512.1 X |
| 4,973,403 | * | 11/1990 | Kozey ................................ 169/13 X |
| 5,241,979 | * | 9/1993 | Chang et al. ..................... 137/550 X |
| 5,269,342 | * | 12/1993 | Portis et al. .......................... 137/588 |
| 5,301,709 | * | 4/1994 | Gasaway ........................ 137/512.1 X |
| 5,318,063 | * | 6/1994 | Muddiman .................... 137/512.1 X |
| 5,860,449 | * | 1/1999 | Schulte ................................. 137/550 |
| 5,884,661 | * | 3/1999 | Plyler et al. ..................... 137/360 X |
| 5,934,558 | * | 8/1999 | Samayoa et al. ............. 137/512.1 X |
| 5,935,434 | * | 8/1999 | Cates ................................... 210/232 |

OTHER PUBLICATIONS

Brochure from Potter–Roemer : Smith Industries, Inc. "Exposed Fire Dept Inlet Connections– Clapper Type" Date Unknown.*
Brochure from Reliable Automatic Sprinkler Co, Inc. Mt. Vernon, NY. Model B Fire Dept. Connection, Dec. 1996.*
Fire Protection Contractor Magazine Advertisement of Knox Company Fire Dept. Connector, Date Unknown.*

* cited by examiner

Primary Examiner—John Rivell
Assistant Examiner—Meredith H Schoenfeld

(57) ABSTRACT

Addow's FDC is different from current FDCs, because it is a FDC and a check valve in one. Addow's FDC saves labor and time when compared to the current FDC, because with current FDC, one has to install a check valve and then install the FDC. With Addow's FDC, it is a one step process. Addow's FDC is equipped with swivels which don't allow debris, garbage or trash to be deposited in the FDC and this makes Addow's FDC debris proof. Addow's FDC allows back flushing test to be performed by removing the 4 inch cap and reversing the FDC.

Addow's FDC, unlike current FDCs, comes with three different styles of outlets, which are grooved, flange, and threaded. This gives the consumers more selections to suit their needs. Current FDCs come only with one style of outlet, which is threaded outlet.

4 Claims, 3 Drawing Sheets

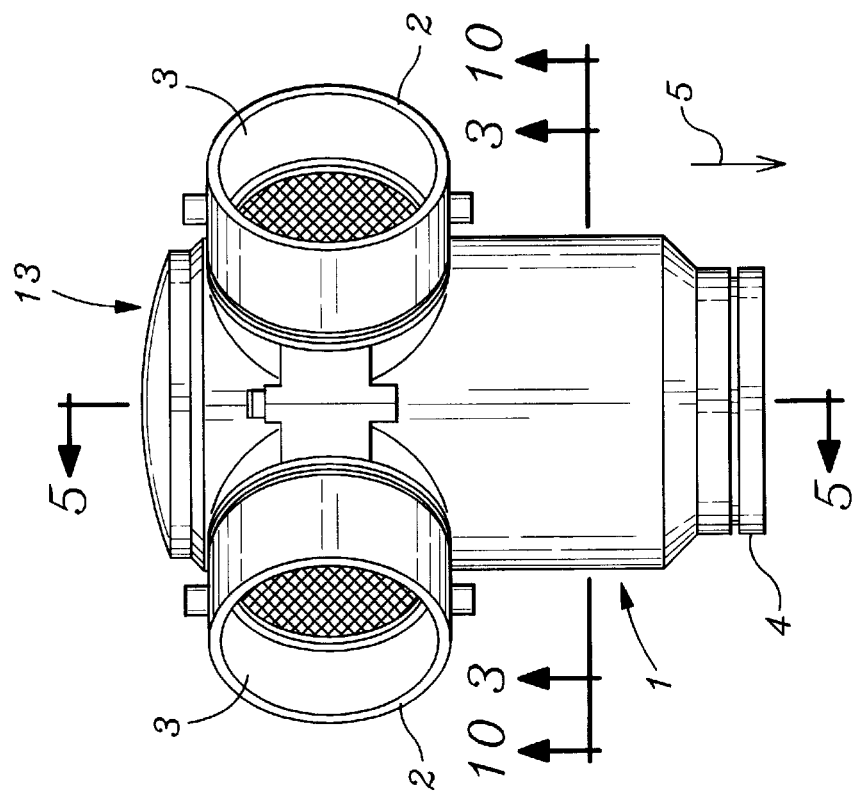
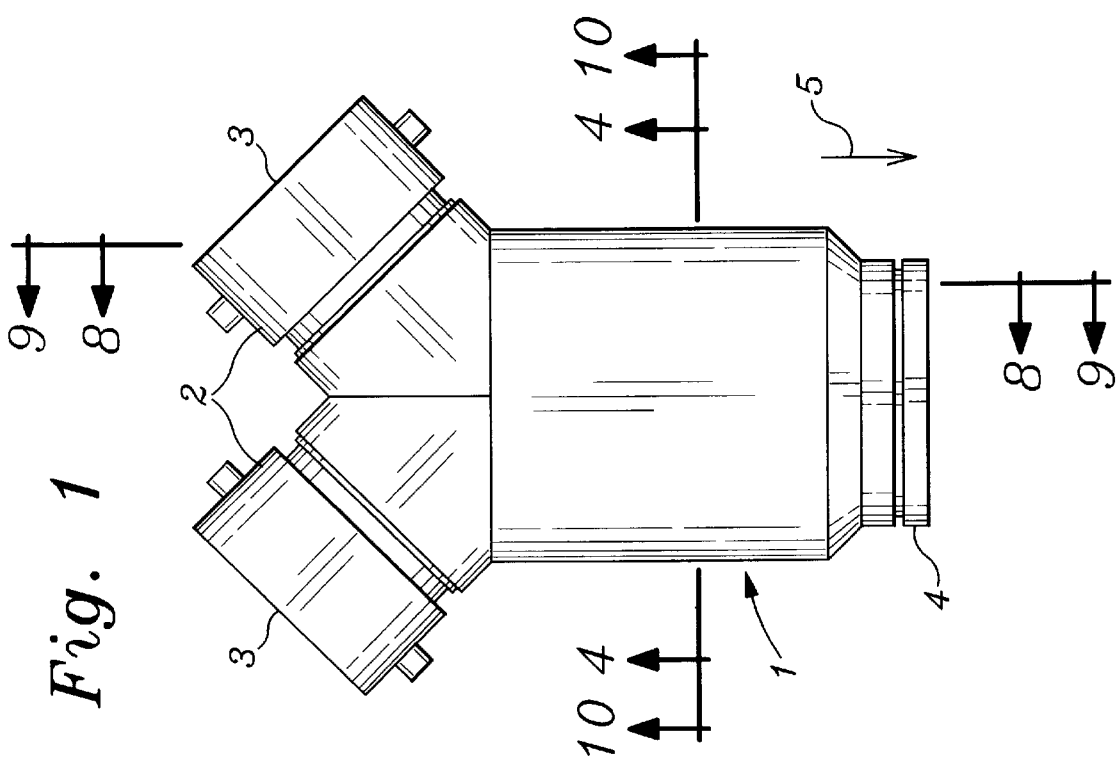

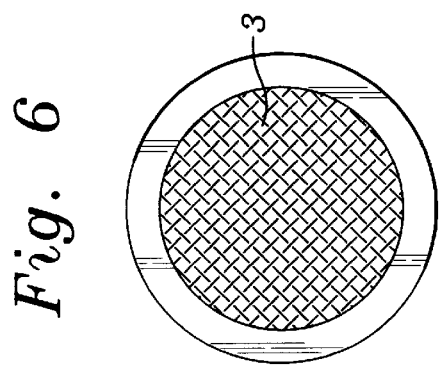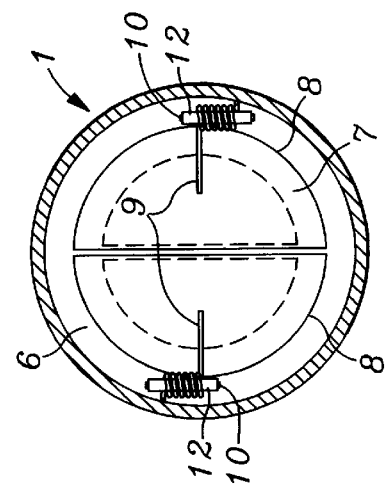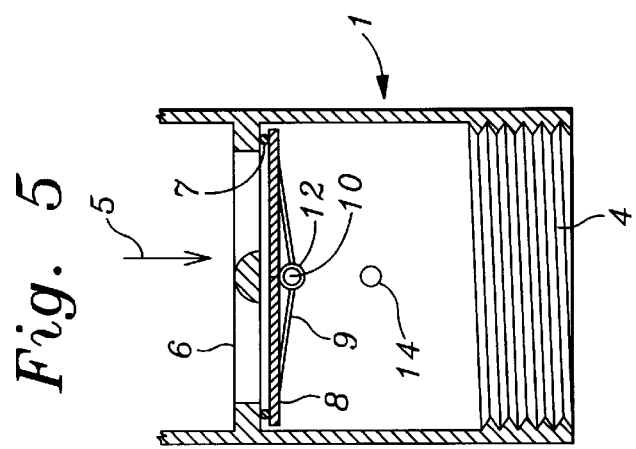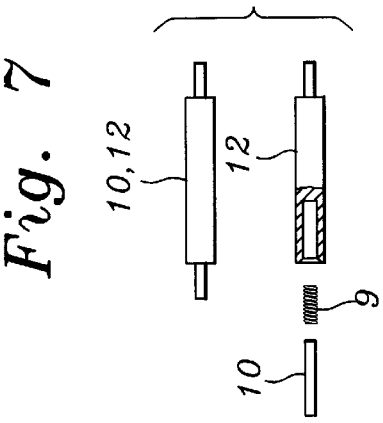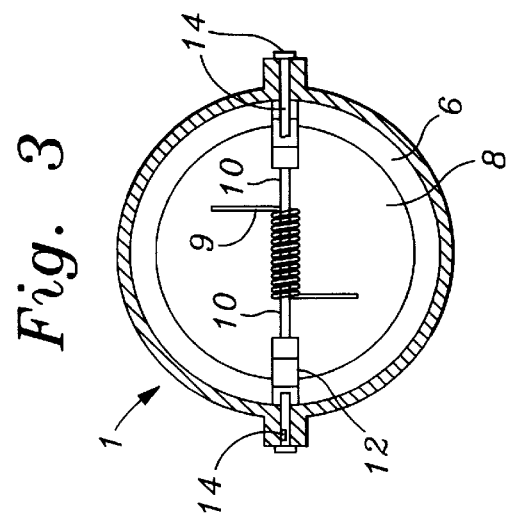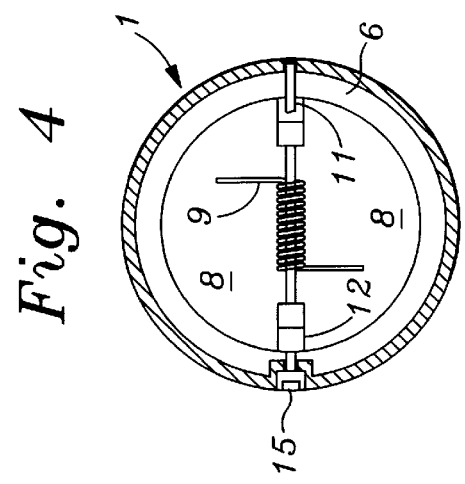

ADDOW'S CHECKVALVED FDC

The word "FDC" stands for fire department connection. FDC is a device located outside of buildings which are equipped with automatic fire sprinkler systems or standpipe systems for fire protection or fire fighting purposes. FDC allows the fire fighters to pump water into a standpipe system or a fire sprinkler system without going inside a building. In case of a fire in a building equipped with fire sprinkler system, the fire fighters will pump water through the FDC to help the fire sprinklers extinguish the fire without going inside the building.

All existing or current FDCs are installed with check valves which allow the water to go in one direction only (in the system direction) and prevent any back flow of water. In other words, current FDCs depend on check valves in order not to let water to flow out of the sprinkler system and into outside of building. Addow's FDC doesn't need a check valve, because it has a check valve built within. Please refer to drawing section detail #B and notations #8 & 9. This detail shows spring loaded clappers that allow the water to flow in one direction only. Please refer to drawing elevation detail and legand #2 (FDC inlet). In case of a fire, the fire fighters will pump water through the FDC inlet by using a public fire hydrant and their fire engine at a pressure of 100 psi and higher. When this process occurs, the spring-loaded clappers of Addow's FDC open up or the clappers shall be pushed down by the bigger pressure of the fire engine and water flows through the FDC and into the fire sprinkler system. And as soon as the pumping of water is stopped, the clappers are pushed back to their original position by the spring. Therefore Addow's FDC is capable of preventing water to flow from the fire sprinkler system to outside, while current FDCs depend on check valves to prevent the back flow of water.

BRIEF DESCRIPTION OF THE DRAWINGS

FIG. 1 shows a top view of the fire department connection.

FIG. 2 shows a side view of the fire department connection.

FIG. 3 shows a top view of the check valve contained in the fire department connection.

FIG. 4 shows an alternate check valve contained in the fire department connection.

FIG. 5 shows a side view of the check valve contained in the fire department connection.

FIG. 6 shows the filter contained in the fire department connection.

FIG. 7 shows the clapper stopper components of the check valve.

FIG. 10 shows an alternate check valve contained in the fire department connection.

Figure 9:
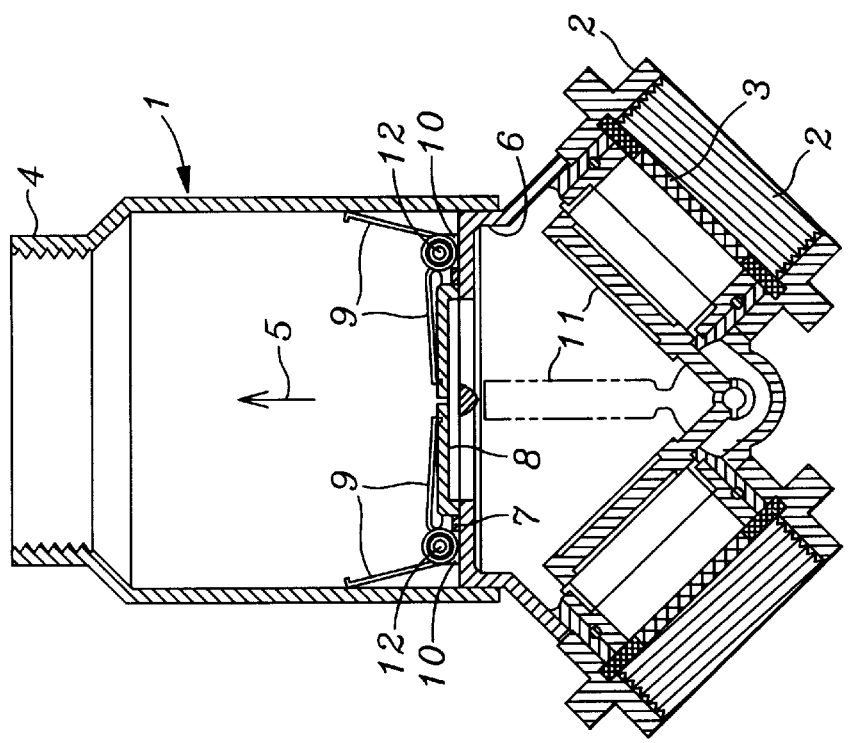
FIG. 9 shows the fire department connection with an alternate check valve.
Figure 8:
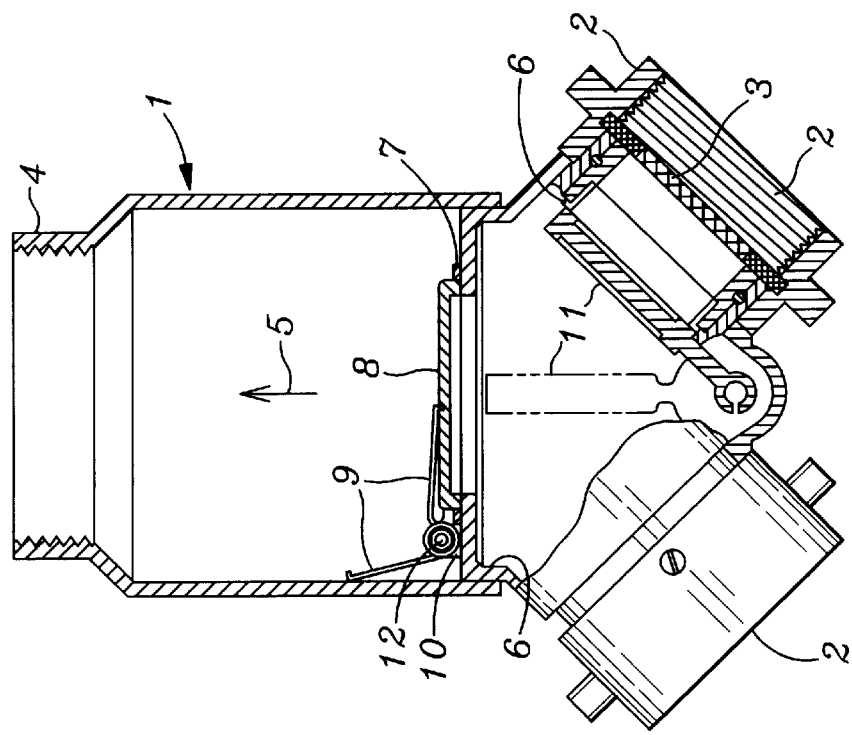
FIG. 8 shows the fire department connection with the check valve.

Current FDCs have FDC inlets equipped with 2½ inch swivels which are female threaded and turn freely, allowing fire fighters to connect their fire hoses to the FDC so they may pump water into the fire sprinkler system. These swivels are equipped with either breakaway plastic and metal caps or male threaded metal caps. These caps are intended to keep garbage, trash or debris (which may cause water obstruction in case of a fire) out of the FDC. The caps are easily removable to avoid any delays to fire fighters pumping water into the fire sprinkler system in case of a fire. However these caps can't prevent garbage, trash or debris to get into the FDC because they can be broken or removed easily. There are some people out there who don't care or don't know the importance of FDCs, these people break FDC caps and deposit trash such as cigarette butts, beer bottles, soda cans, Styrofoam cups, etc. which are large enough to obstruct water flow into the fire sprinkler system. Addow's FDC in comparison: please see drawing (elevation detail) legend notations #1, 2 and 3. Addow's FDC shall have all the features of the current FDC (2½ inch swivel & 2½ inch breakaway caps). Since these features don't actually prevent garbage or trash to be deposited into the FDC, Addow's FDC's swivel is equipped with a removable strong metallic mesh water filter with a rubber coated outer circumference which doesn't allow garbage or trash to be deposited into the FDC and therefore allows the flow of water into the fire sprinkler system without any obstruction.

Addow's FDC's swivel is a future hope for existing FDCs for preventing garbage or trash, which causes water flow obstruction, to get into the FDCs. All FDC swivels are removable and replaceable so Addow's FDC swivel can be manufactured separately and can be installed on any FDC in the USA.

Authorities having jurisdiction to be tested and back flushed every one to five years require all fire sprinkler systems. Back flushing means water flows out of the sprinkler system instead of going into the system, to get any debris or trash out of the system. All the fire sprinkler contractors perform this back flushing test by using the FDC, and it is done as follows: first they remove the FDC and the check valve, then they reinstall the check valve reversed so water can be flushed from the system to outside through the check valve. After the back flushing is done, they remove the FDC and check valve again and reinstall them in the normal order. Addow's FDC allows this back flushing test procedure by removing the 3-inch male threaded cap (refer to drawing elevation detail, legend notation #5) and installing Addow's FDC in reverse. After the test is done, the FDC shall be installed in the normal manner with the 4-inch cap screwed back on the FDC. All current or existing FDCs come in many styles such as straight, 90 angle and 45 angle for the purpose of giving the consumers more options or flexibility of installation. But when it comes to FDC outlet, there is no choice because current FDCs come with female threaded outlets only.

Addow's FDC comes with three different styles of outlets (please refer to drawing elevation view & legend/notation #4):

1. 4" grooved outlet.
2. 4" flange outlet
3. 4" threaded outlet (same as current FDCs).

Furthermore Addow's FDC comes with three styles, straight, 90 angle & 45 angle FDC, same as current FDCs, although this design shows only the 90 angle FDC.

What is claimed is:

1. A reversible fire department connection comprising two axially opposite ends, each end being removably coupled to a stand pipe attachment of a building fire sprinkler system, one end having one or more passages for accommodating normal in flow or out flow, and an axial passage closeable by a removable cap, a check valve comprising spring loaded pivotal clappers located in the other end, in a first operative position of the fire department connection water is supplied to the fire sprinkler system, and in a second operative position of the fire department connection water is drained from the sprinkler system by removing the cap and connecting the axial passage end to the standpipe attachment, and a removable filter comprising metallic screener with rubber coated outer circumference for stopping debris from entering the fire sprinkler system located in the one or more inlet passages.

2. The reversible fire department connection according to claim 1 wherein each end removably coupled to the standpipe connection is grooved.

3. The reversible fire department connection according to claim 1 wherein each end removably coupled to the standpipe is flanged.

4. The reversible fire department connection according to claim 1 wherein each end removably coupled to the standpipe connection is threaded.

\* \* \* \* \*